US010425239B2

(12) United States Patent
Chitre et al.

(10) Patent No.: US 10,425,239 B2
(45) Date of Patent: Sep. 24, 2019

(54) CROWD-SOURCED AUDIO QUALITY FEEDBACK IN A CONFERENCING SYSTEM

(71) Applicant: American Teleconferencing Services, Ltd., Atlanta, GA (US)

(72) Inventors: Monica Chitre, Watchung, NJ (US); J Douglas Martin, Manitou Springs, CO (US); Rishi Kaneria, Smyrna, GA (US); Patrick Harper, Marietta, GA (US); Teresa Hoffman, Atlanta, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 168 days.

(21) Appl. No.: 15/691,869

(22) Filed: Aug. 31, 2017

(65) Prior Publication Data

US 2019/0068389 A1  Feb. 28, 2019

(51) Int. Cl.
*H04L 12/18* (2006.01)
*H04L 12/58* (2006.01)

(52) U.S. Cl.
CPC ...... *H04L 12/1827* (2013.01); *H04L 12/1831* (2013.01); *H04L 12/1863* (2013.01); *H04L 51/18* (2013.01)

(58) Field of Classification Search
CPC ............. H04L 12/1827; H04L 12/1831; H04L 12/1863; H04L 51/18
See application file for complete search history.

(56) References Cited

U.S. PATENT DOCUMENTS

| 9,350,869 | B1* | 5/2016 | Lasser | H04M 3/563 |
| 2003/0224780 | A1* | 12/2003 | Rodman | H04L 12/66 455/426.1 |
| 2008/0080484 | A1* | 4/2008 | Hughes | H04L 29/06027 370/352 |
| 2009/0094029 | A1* | 4/2009 | Koch | H04M 3/42221 704/246 |
| 2013/0279678 | A1* | 10/2013 | Beerse | H04M 3/2227 379/202.01 |
| 2016/0261749 | A1* | 9/2016 | Femal | H04M 3/568 |

* cited by examiner

*Primary Examiner* — Mohamed A. Wasel
(74) *Attorney, Agent, or Firm* — Robert A. Blaha; Smith Tempel Blaha LLC

(57) ABSTRACT

Various embodiments of systems, methods, and computer programs are presented. An exemplary embodiment of a method includes a conferencing system establishing an audio conference between a plurality of participants via a communication network; providing a conference user interface to the plurality of participants; in response to a first participant speaking during the audio conference, a second participant indicating via the conference user interface that the first participant has low-quality audio; the conferencing system polling one or more additional participants to specify via the conference user interface audio quality feedback associated with the first participant; determining from the feedback the first participant has low-quality audio; attempting to correct the audio connection with the first participant, if unable to correct the audio connection, notifying the first participant of the low-quality audio with suggested actions.

17 Claims, 12 Drawing Sheets

CROWD-SOURCED AUDIO QUALITY FEEDBACK IN A CONFERENCING SYSTEM

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings may include an audio component and a visual component, such as, a shared presentation, video, whiteboard, or other multimedia, text, graphics, etc. These types of convenient conference solutions have become an indispensable form of communication for many businesses and individuals.

A far-too-common problem, however, occurs when one or more participants in the audio conference have poor audio quality resulting from, for example, environmental noise, poor audio equipment, a poor network connection, software configuration, etc. When such problems arise, there is no way of systematically identifying whether audio issues are caused by a problem related to the speaking participant or one of the listening participants.

Accordingly, despite the many advantages and commercial success of existing conference, meeting, grouping or other types of gathering systems that include an audio component, there remains a need in the art for improved systems and methods for enabling participants to systematically identify and/or resolve audio quality and/or audio connection issues.

SUMMARY

Various embodiments of systems, methods, and computer programs are disclosed for providing crowd-sourced audio quality feedback in a conferencing system. An exemplary embodiment of a method comprises: a conferencing system establishing an audio conference between a plurality of participants via a communication network; providing a conference user interface to the plurality of participants; in response to a first participant speaking during the audio conference, a second participant indicating via the conference user interface that the first participant has low quality audio; and the conferencing system polling one or more additional participants to specify via the conference user interface audio quality feedback associated with the first participant.

An exemplary embodiment of such a computer system comprises a conferencing system and a server. The conferencing system establishes an audio conference between a plurality of participants via a communication network. The server is configured to communicate with the conferencing system and provide a conference user interface to the plurality of participants. The server comprises one or more crowd-sourced audio quality feedback modules comprising logic configured to: in response to a first participant speaking during the audio conference and via the conference user interface, receive audio quality feedback data from a second participant indicating that the first participant has low quality audio; and in response to the audio quality feedback data from the second participant, poll one or more additional participants to specify via the conference user interface further audio quality feedback data associated with the first participant.

DETAILED DESCRIPTION

Various embodiments of systems, methods, and computer programs are disclosed for providing crowd-sourced audio quality feedback in a conferencing system. As described below in more detail with reference to FIGS. 1-12, the conferencing system may establish an audio conference between a plurality of participants. Each participant may operate a computing device for accessing a corresponding online or web conference component provided via a conference user interface. The conference user interface enables the participants in the audio conference to interact with each other. It should be appreciated that the conference user interface may support various web conference functionality and features.

As mentioned above, a ubiquitous problem in conventional audio conferences occurs when one or more participants have poor audio quality resulting from, for example, environmental noise, poor audio equipment, a poor network connection, software configuration, etc. When such problems arise in existing conferencing systems, there is no way of systematically identifying whether audio issues are caused by a problem related to the speaking participant or one of the listening participants. As described below in more detail, a conference user interface may be configured to address these problems via one or more crowd-sourced audio quality feedback modules. In general, the crowd-sourced audio quality feedback feature enables the participants in an audio conference to systematically provide audio quality feedback via the conference user interface. The audio quality feedback may be separately submitted by one or more participants via, for example, participant feedback modules and/or collectively submitted via, for example, participant polling modules. Based on the submitted audio quality feedback, the conferencing system may automatically identify and resolve audio quality and/or audio connection issues. Furthermore, the conferencing system may generate and present notifications to the participants with suggestions for self-correcting audio quality and/or audio connection issues.

Figure 1:
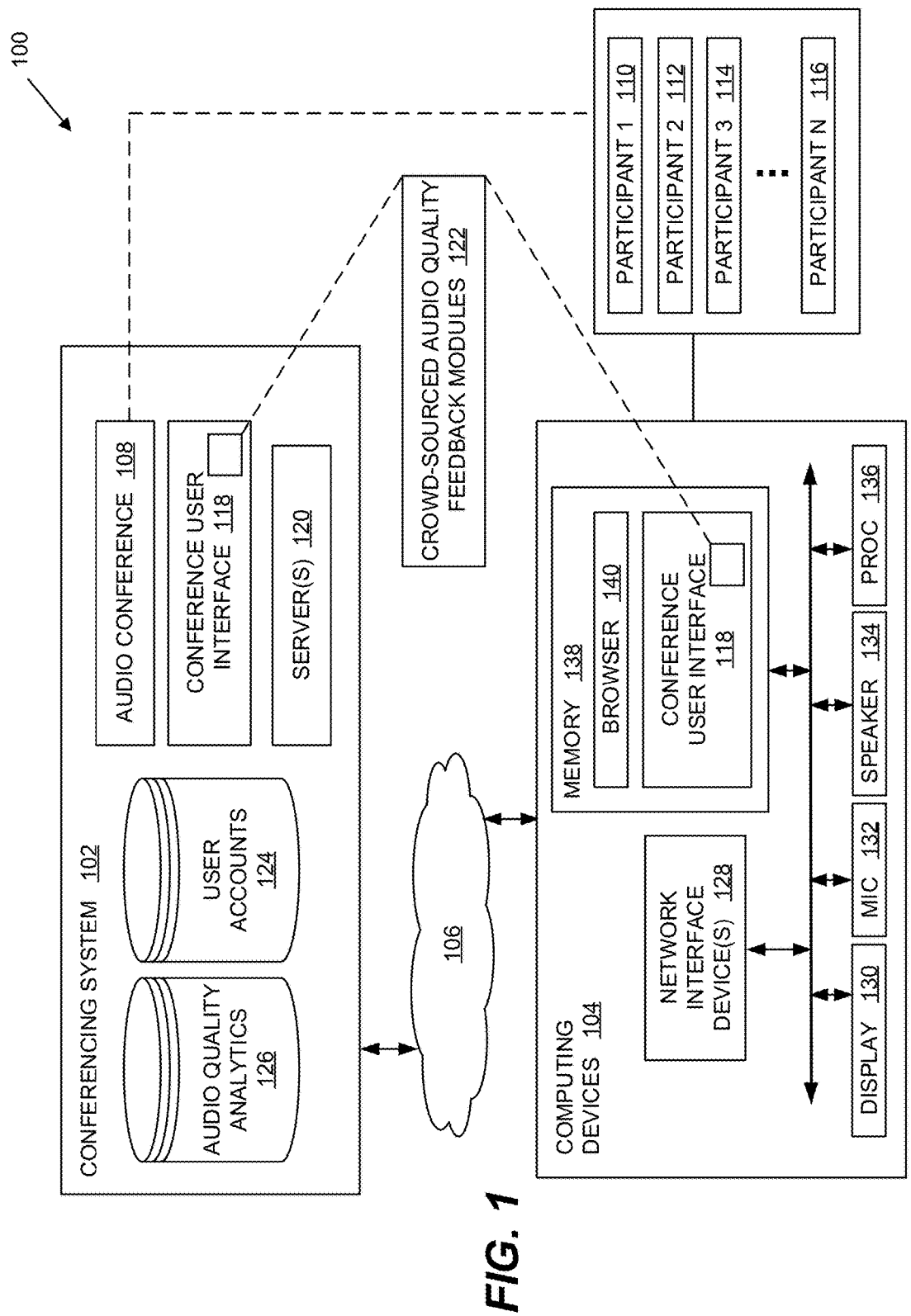
FIG. 1 is a block diagram illustrating an embodiment of a system for providing crowd-sourced audio quality feedback in a conferencing system.

FIG. 1 illustrates an exemplary embodiment of a computer system 100 for implementing crowd-sourced audio quality feedback. The computer system 100 comprises a conferencing system 102 configured to establish an audio conference 108 between one or more participants accessing the conferencing system 102 via a corresponding computing device 104. The computing devices 104 may be connected to the conferencing system 102 and/or associated server(s) 120 via one or more communication networks (e.g., the Internet, the Public Switched Telephone Network (PSTN), etc.). The communication network(s) 106 may support wired and/or wireless communication via any suitable protocols, including, for example, the Internet, the Public Switched Telephone Network (PSTN), cellular or mobile network(s), local area network(s), wide area network(s), VoIP, or any other suitable communication protocols, service providers, infrastructure, etc.

As illustrated in FIG. 1, the audio conference 108 may involve any number of participants (e.g., a first participant 110, a second participant 112, a third participant 114, an Nth participant 116). Each participant's computing device 104 may be used to access an online conference comprising the audio conference 108 and a corresponding online or web conference component for enabling participants to interact with each other via a conference user interface 118 that provides various web conference functionality and features. As described below in more detail, the conference user interface 118 may support one or more modules 122 for implementing certain aspects of the crowd-sourced audio quality feedback.

It should be appreciated that, although the embodiment of FIG. 1 illustrates the participants accessing the audio conference 108 and the conference user interface 118 via a single computing device 104, in other embodiments a participant may access the audio conference 108 via one device (e.g., a landline phone, a mobile phone, a smart phone, a first computing device 104a, etc.) and the conference user interface 118 via a second computing device 104b.

The computing devices 104 may comprise any desirable computing device, which is configured to communicate with the conferencing system 102 and server(s) 120 via the communication networks 106. The computing device 104 may comprise, for example, a personal computer, a desktop computer, a laptop computer, a mobile computing device, a portable computing device, a smart phone, a cellular telephone, a landline telephone, a soft phone, a voice over Internet protocol (VoIP) phone, a web-enabled electronic book reader, a tablet computer, a smart watch, or any other computing device capable of communicating with the conferencing system 102 and/or the server(s) 112 via one or more communication networks. The computing device 104 may include client software (e.g., a browser 140, a plug-in, a native application, such as, a mobile application, or other functionality) configured to facilitate communication with the conferencing system 102 and/or the server 112. It should be appreciated that the hardware, software, and any other performance specifications of the computing device 104 are not critical and may be configured according to the particular context in which the computing device 104 is to be used.

In the embodiment illustrated in FIG. 1, the computing device 104 may include network interface devices 128, a display 130, a microphone 132, a speaker 134, one or more input/output devices, and a processor 136 for executing software and/or firmware associated with a memory 138. The networking interface devices 128 enable the computing device 104 to communicate with the conferencing system 102 via any desirable communication networks. The microphone 132 and speaker 134 enable the participant to speak and listen to the audio conference 108. The conference user interface 118 may be presented to and displayed via a graphical user interface and an associated display 130 (e.g., touchscreen display device or other display device).

Figure 2:
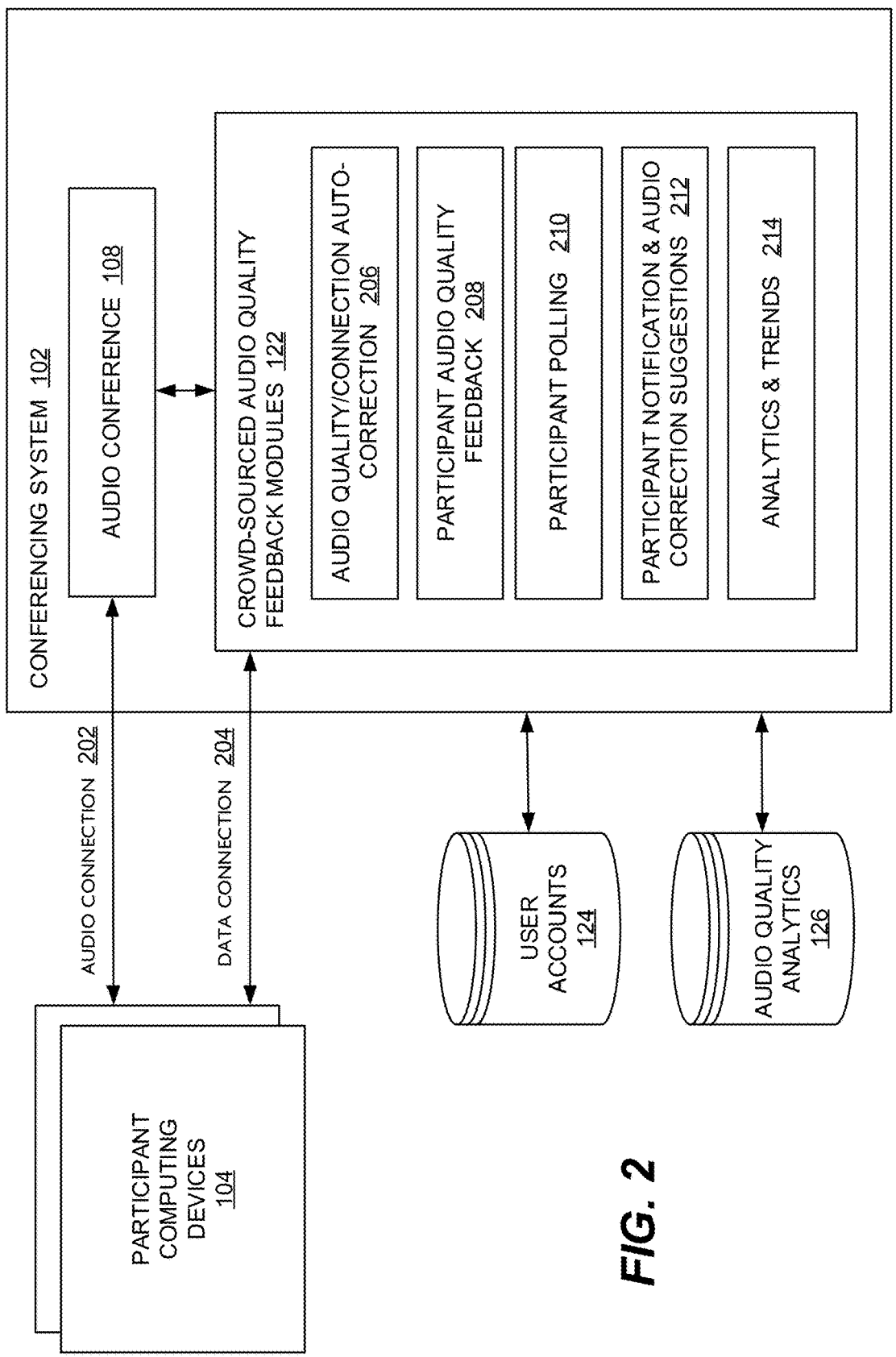
FIG. 2 is a block/flow diagram illustrating the architecture, operation, and/or functionality of an embodiment of the crowd-sourced audio quality feedback modules in the system of FIG. 1.

In the embodiment of FIG. 1, the conferencing system 102 generally comprises a communication system for establishing an online conference (e.g., an audio conference 108) between the computing devices 104. The conferencing system 102 may support audio via a voice network and/or a data network. It should be appreciated that the conferencing system 102 may support various technologies, protocols, standards, features, etc. for implementing an audio connection 202 and a data connection 204 to the participant computing devices 104. As illustrated in FIG. 2, the audio connection 202 may support a participant audio stream to the audio conference 108. The data connections 204 may be used to facilitate data communication between the computing devices 104 and the conferencing system 102 for implementing various aspects of the crowd-sourced audio quality feedback modules 122.

The conferencing system 102 may establish the audio conference 108 by combining the audio connections 202 associated with the participant computing devices 104. Each audio connection 202 may be associated with a corresponding participant identifier. The participant identifiers may be stored in a user database 124 with each participant identifier being logically associated with a corresponding audio stream that identifies the participant. The user database 124 may store any suitable account information for the participants.

As further illustrated in FIG. 1, conferencing system 102 may comprise one or more server(s) 112 that are configured to establish the audio conference 108 and control presentation of the conference user interface 118 to the computing devices 104 during the audio conference 108. It should be appreciated that any aspects of the crowd-sourced audio quality feedback modules 122 may be stored and/or executed by the computing devices 104, the conferencing system 102, the servers 120, or other related server(s) or web services.

FIG. 2 illustrates an exemplary embodiment for implementing various features related to the crowd-sourced audio quality feedback. In this embodiment, the crowd-sourced audio quality feedback modules 122 comprise separate modules 206, 208, 210, 212, and 214, which may exchange relevant data inputs/outputs with each other. Participant audio quality feedback module 208 comprises logic configured to enable the participants to specify, via the conference user interface 108, audio quality feedback of another participant speaking during the audio conference 108. Exemplary embodiments of user interface controls for supporting the audio quality feedback are illustrated in FIGS. 4-9 and described below in more detail.

Audio quality/connection auto-correction module 206 may be configured to receive the submitted audio quality feedback from participant audio quality feedback module 208. In response to the submitted audio quality feedback, the conferencing system 102 may analyze potential sources of the audio-related problem and attempt to automatically correct one of the audio connections 202. It should be appreciated that the conferencing system 102 may attempt to automatically correct various types of audio-related problems. In one example, the conferencing system 102 may perform microphone gain adjustment to correct for sound being too low or too high. The conferencing system 102 may select one of a variety of devices and adjust for combinations that are known to cause echo and, in response, suggest or execute alternatives. The conferencing system 102 may also detect mismatched input/output devices for one of the audio connections 202 (e.g., a headset for input and a computer speaker for output and) and, in response, suggest or executive alternatives. The conferencing system 102 may also support a "smart mute" feature to determine if one of the participants is talking while on mute and then prompt the participant, via the corresponding conferencing user interface 118, to unmute their audio connection 202. Furthermore, a "smart noise detect/cancel" feature may be provided to either automatically cancel noise and/or prompt the participant to mute their audio connection 202 when the conferencing system 102 detects background noise (e.g., the participant is typing or other noise is detected). The conferencing system 102 may also detect and automatically correct for various connection issues. An audio connection 202 may have a low quality connection due to, for example, latency, jitter, etc. that may cause dropped audio packets and, in response, suggest or execute establishing another connection.

Analytics & trends module 214 comprises logic configured to maintain a log of all participant-submitted audio quality feedback, as well as, the results of audio quality/connection auto-correction module 206. The analytics & trends module 214 may log any types of data, parameters, etc. related to any of the audio-related problems described above, as well as the measures used to attempt to correct them. The analytics & trends module 214 may also include contextual and other related data to check for trends related to specific locations (e.g., geo-location data), time and date of the occurrence, participants, participant devices, software configurations, connection types, carriers, etc. In this regard, the analytics & trends module 214 may determine problems related to system high load times, specific audio connection methods (e.g., softphone, PSTN, etc.), and audio devices (e.g., Bluetooth, wired, etc.). Additional tracked data may include, conference details, a conference identifier, participant identifiers, number of participants, other types of connections, and the type of activity occurring via the conference user interface 118 when the problem occurs (e.g., screen share, web cams, or other high-bandwidth activity).

Figure 10:
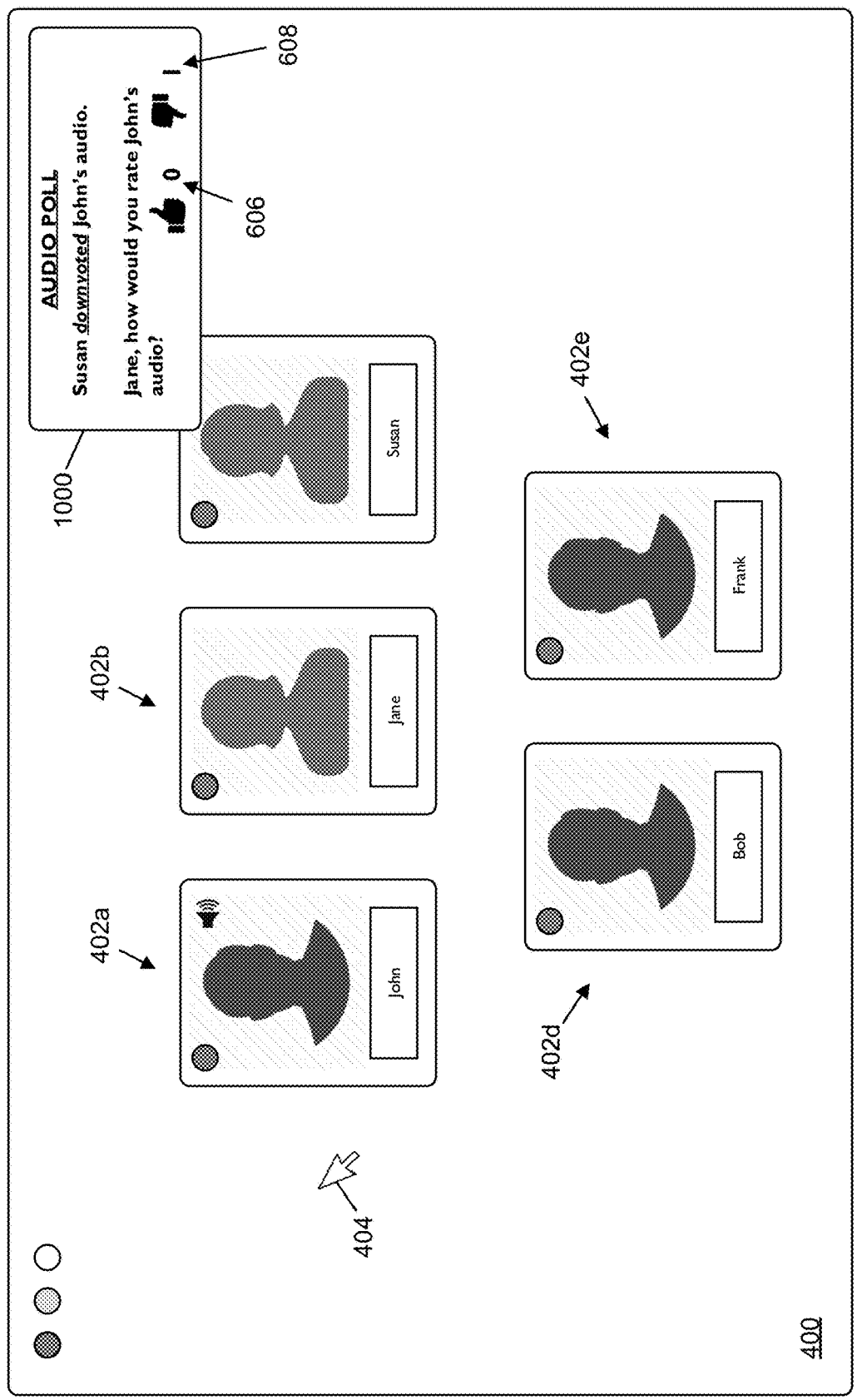
FIG. 10 illustrates another screen shot of the conference user interface for implementing an embodiment of a method for polling additional participants for audio quality feedback related to John.

Participant polling module 210 comprises logic configured to poll one or more of the participants in the audio conference 108, via the conference user interface, for audio quality feedback for a specific participant. In an embodiment, the polling functionality may be initiated in response to one of the participants being identified as having low quality audio or another audio-related problem. An exemplary user interface component for implementing the participant polling module 210 is illustrated in FIG. 10. Participant polling module 210 may aggregate the polling results and, in response, determine whether the audio issue is related to the speaking participant or the participant(s) who specified the low audio quality feedback.

Figure 11:
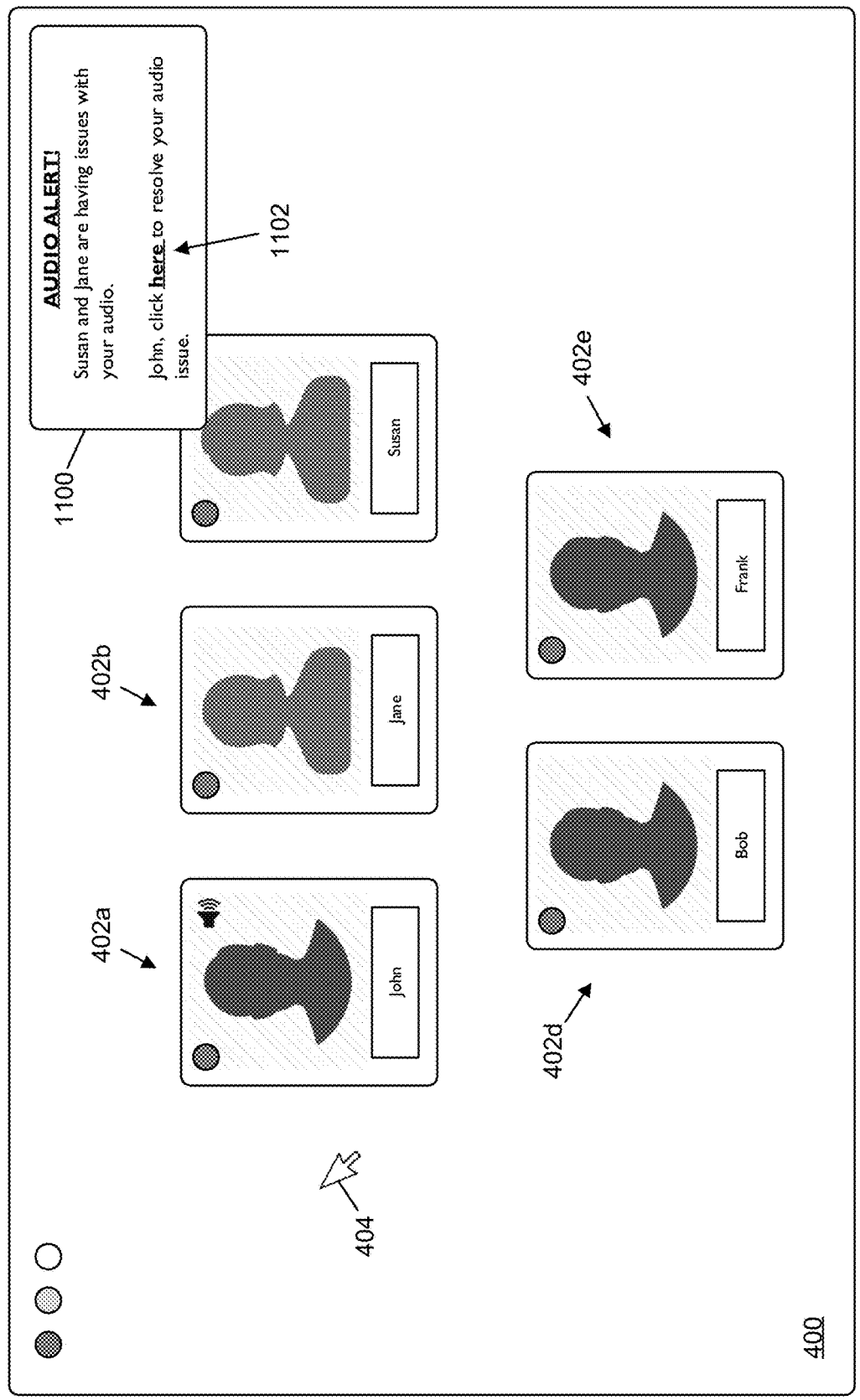
FIG. 11 illustrates a further screen shot of the conference user interface for notifying John, in response to the polling results, that he may have an audio issue.
Figure 12:
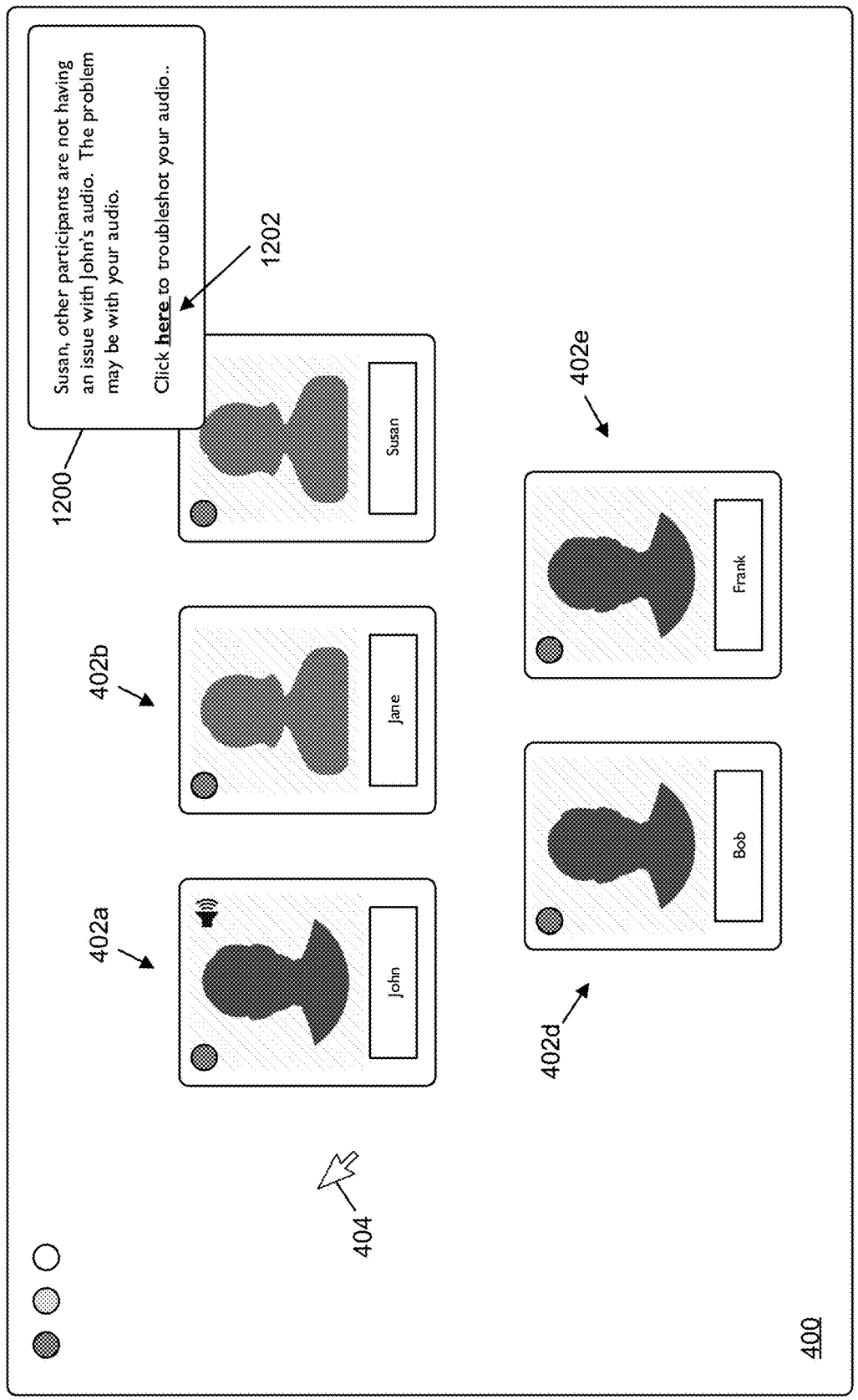
FIG. 12 illustrates another screen shot of the conference user interface for notifying Susan, in response to the polling results, that she may have an audio issue.

Participant notification & audio correction suggestions module 212 comprises logic configured to send notifications to the participants in the audio conference 108 via conference user interface 118. The content and recipients of the notifications may be customized and/or triggered by any of modules 206, 208, and 212. Exemplary notifications are illustrated in FIGS. 11 & 12 and described below.

Having described the general architecture, operation, and functionality of the crowd-sourced audio quality feedback modules 122, an exemplary method 300 (FIG. 3) and various embodiments of the conference user interface 118 will be described. It should be appreciated that the method 300 one or more of the process or method descriptions associated with FIG. 3 may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the computer system 100. Furthermore, the logical functions may be embodied in any computer readable medium residing in the conferencing system 102, the server(s) 120, or the computing devices 104 for use by or in connection with an instruction execution system, apparatus, or device, such as a computer-based system, processor-containing system, or other system associated with the computer system 100 that can fetch the instructions from the instruction execution system, apparatus, or device and execute the instructions.

Figure 3:
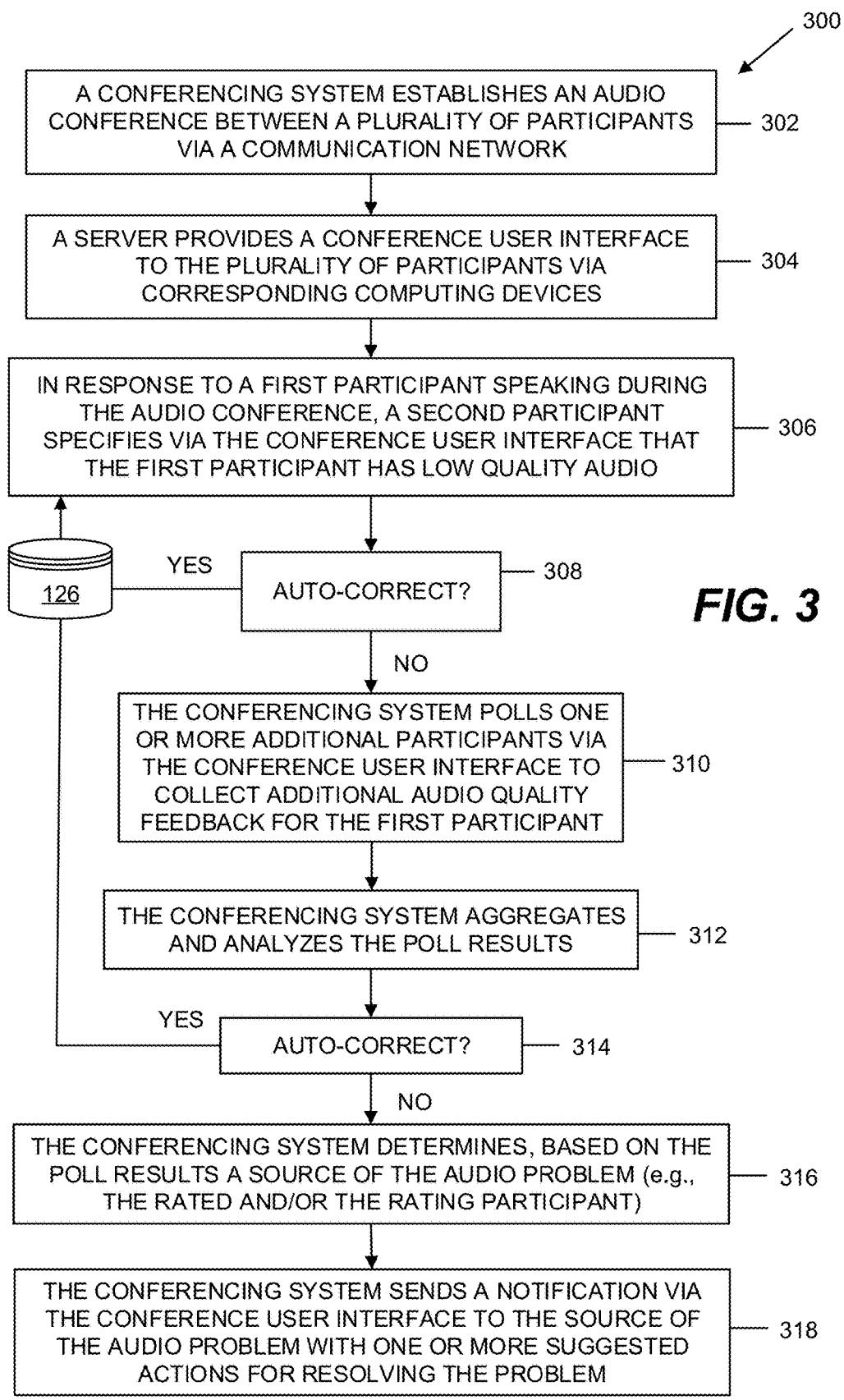
FIG. 3 is a flowchart illustrating an embodiment of a method for providing crowd-sourced audio quality feedback in the conferencing system of FIG. 1.

FIG. 3 illustrates an embodiment of a method 300 for providing crowd-sourced audio quality feedback in the conferencing system 102. At block 302, the conferencing system 102 establishes an audio conference 108 between a plurality of participants. The participants may access the conferencing system 102 with corresponding computing devices 104 electrically coupled to the conferencing system 102 via communication network(s) 106. At block 304, during the audio conference 108, server(s) 120 present the conference user interface 118 to the participant computing devices 104. As mentioned above, a participant may access the audio conference 108 and the conference user interface 118 via the same computing device 104 or separate computing devices 104. Regardless the embodiment, as illustrated in FIG. 2, the conferencing system 102 logically associates each participant with a corresponding audio connection 202 and data connection 204. In response to a first participant speaking during the audio conference 108, a second participant may specify (block 306), via the conference user interface 118, the perceived audio quality of the speaking first participant.

Figure 4:
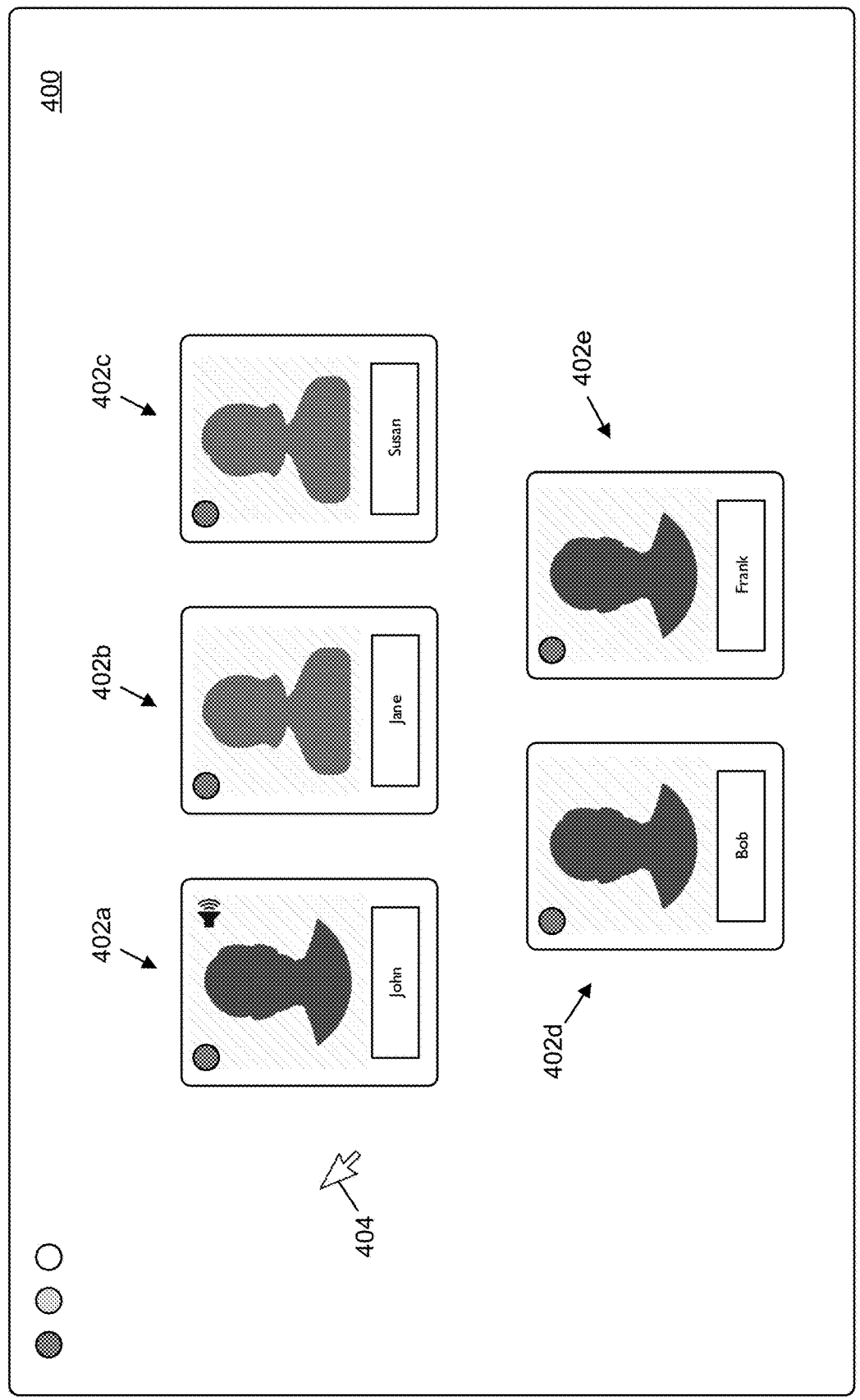
FIG. 4 is a screen shot of an exemplary embodiment of a conference user interface for implementing certain aspects of the crowd-source audio quality feedback modules.

FIG. 4 is a screen shot 400 illustrating an exemplary embodiment of a conference user interface 118. The conference user interface 118 may visually identify each participant in the audio conference 108 with an interactive participant object 402. In the exemplary embodiment of FIG. 4, the audio conference 108 involves five participants: John, Jane, Susan, Bob, and Frank. John is identified with interactive participant object 402a. Jane is identified with interactive participant object 402b. Susan is identified with interactive participant object 402c. Bob is identified with interactive participant object 402d. Frank is identified with interactive participant object 402e.

Figure 5B:
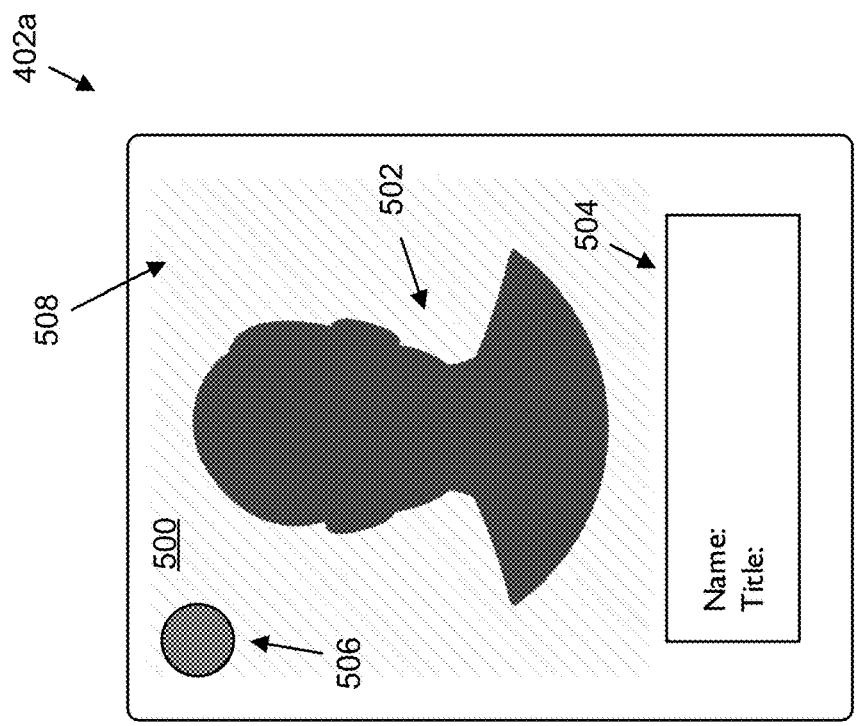
FIG. 5b illustrates an interactive participant object displayed in the conference user interface while the corresponding participant is not speaking.
Figure 5A:
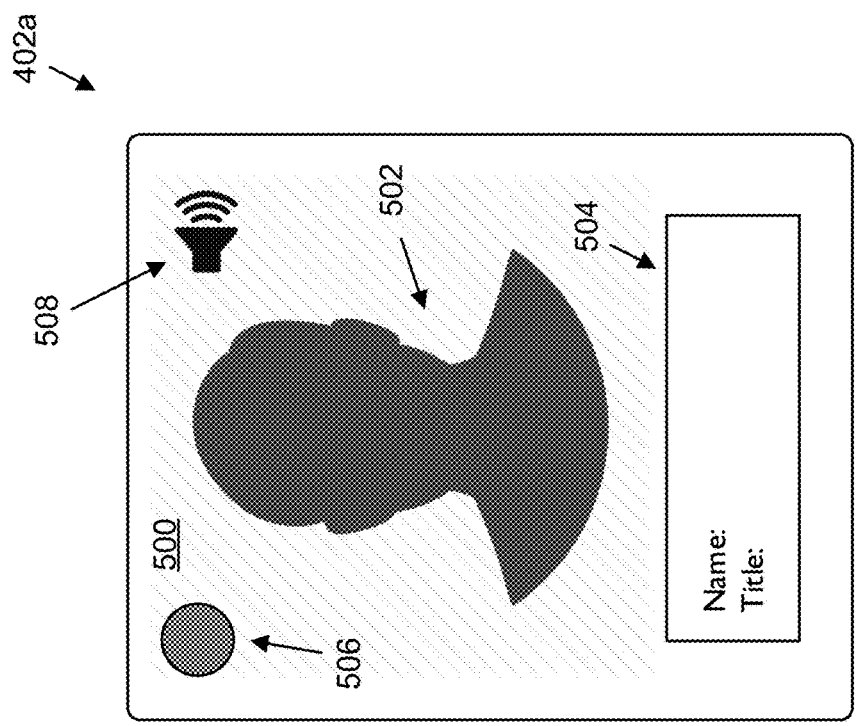
FIG. 5a illustrates an interactive participant object displayed in the conference user interface while the corresponding participant is speaking.

Each interactive participant object 402 may comprise a default state 500 for displaying participant profile information. As best illustrated in FIGS. 5a & 5b, the default state 500 of an interactive participant object 402 may display a graphical representation 502 uniquely identifying the corresponding participant. The graphical representation 502 may comprise a graphic, icon, avatar, or photograph of the participant. In an embodiment, the graphical representation 502 may be uploaded by the participant or imported from other remote user accounts (e.g., social network service provider, online services, etc.) and stored in the user database 124. The default state 500 may display additional participant information in a display portion 504. The additional participant information may comprise, for example, the participant's name, title, or any other customizable information.

It should be appreciated that the interactive participant objects 402 may include various interactive functionality, which may be initiated via one or more user interface controls 506. The user interface controls 506 may be configured to provide different functionality depending on whether the participant is selecting (e.g., via cursor 404) their own interactive participant object or the interactive participant object of another participant. When a participant selects their own interactive participant object, the user interface control 506 may enable the participant to customize, for example, their displayed profile information, graphical representation 502, etc. When a participant selects the interactive participant object of another participant, the selected interactive participant object may display additional profile information (e.g., social networking profiles, social networking feeds, etc.) and/or provide displays for communicating with the other participant.

The interactive participant objects 402 may support functionality for visually displaying when a participant is speaking during the audio conference 118. FIG. 5a illustrates the interactive participant object 402a when the corresponding participant is speaking. An audio indicator icon 508 may be triggered when the participant is speaking. FIG. 5b illustrates the interactive participant object 402a without the audio indicator icon 508 being displayed to visually indicate that the participant is not currently speaking.

Figure 6:
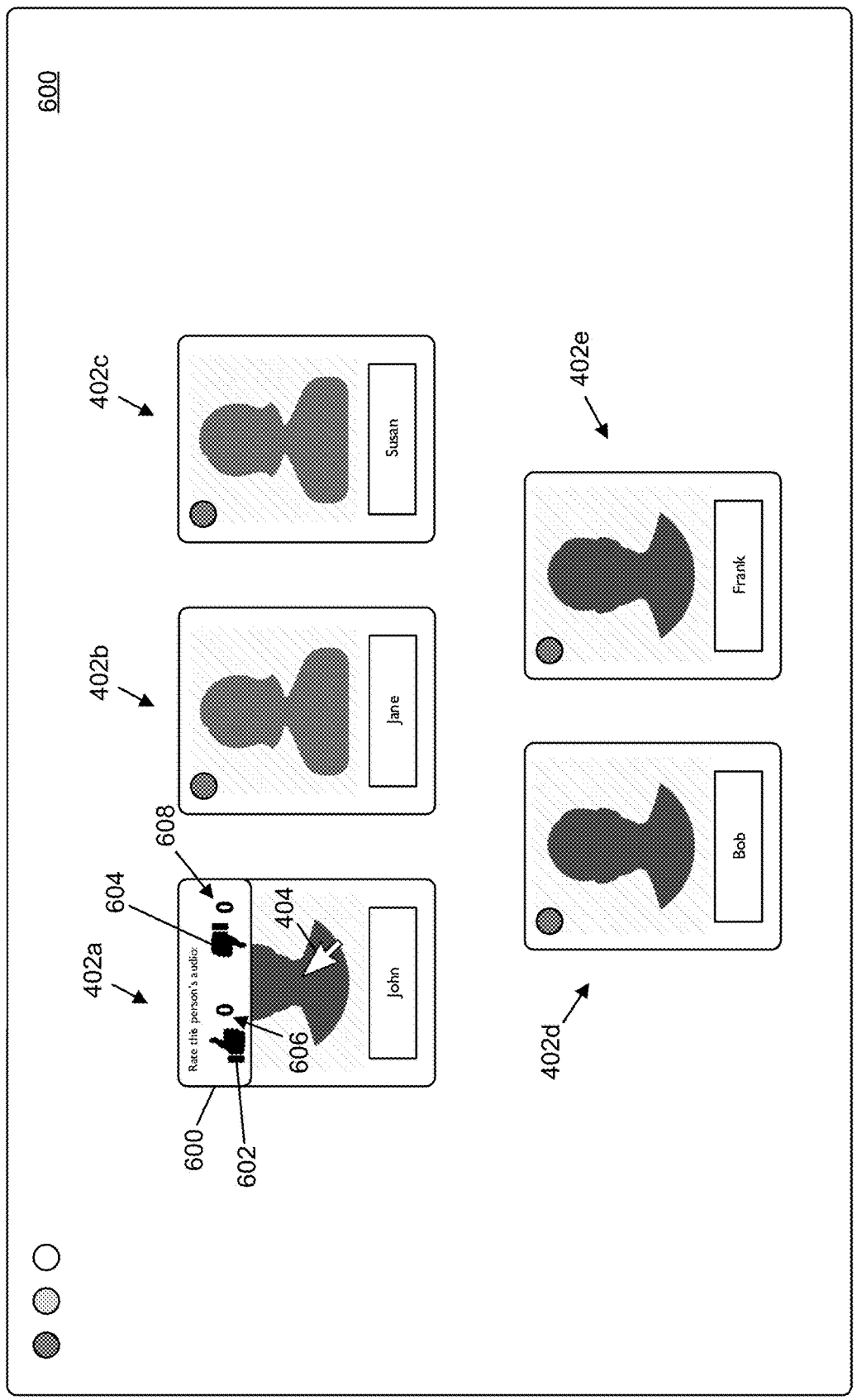
FIG. 6 is a screen shot illustrating an embodiment of a method for enabling one of the participants to provide audio quality feedback for another participant via the corresponding interactive participant object.

Referring again to block 306 in FIG. 3, when a first participant is speaking during the audio conference 108, a second participant may interact with the first participant's interactive participant object 402 to specify the perceived audio quality of the speaking first participant. For example, the screen shot 400 of FIG. 4, illustrates the conference user interface 118 presented to Susan during the audio conference 108. As illustrated in FIG. 4, when John is speaking during the audio conference 108, John's interactive participant object 402a may be modified to display the audio indicator icon 508. In response to the display of the audio indicator icon 508, Susan may interact with John's interactive participant object 402a to submit positive or negative audio quality feedback. In an embodiment, Susan may select John's interactive participant object 402a. In the embodiment of FIG. 6, Susan may "mouse-over" John's interactive participant object 402a. In response to the user selection or "mouse-over", the conference user interface 118 presented to Susan may be modified to provide one or more user interface controls for specifying the audio quality feedback.

In the embodiment of FIG. 6, in response to Susan's user interaction, John's interactive participant object 402a may be modified with a display 600. The display 600 may comprise a text notification (e.g., "Rate this person's audio") prompting Susan to specify audio quality feedback. Display 600 may comprise any desirable user interface controls. In the embodiment of FIG. 6, display 600 comprises feedback icons 602 and 604 for specifying positive and negative feedback, respectively. Positive feedback icon 602 may comprise a "thumbs up" icon. Negative feedback icon 604 may comprise a "thumbs down" icon. It should be appreciated that any text, graphics, icons, etc. may be used to prompt Susan for the audio quality feedback. Positive and negative feedback icons 602 and 604 may also display numerical counters 606 and 608, respectively, for indicating how many participants in the audio conference 108 have provided positive feedback (e.g., "upvoted") or negative feedback (e.g., "downvoted").

Figure 7:
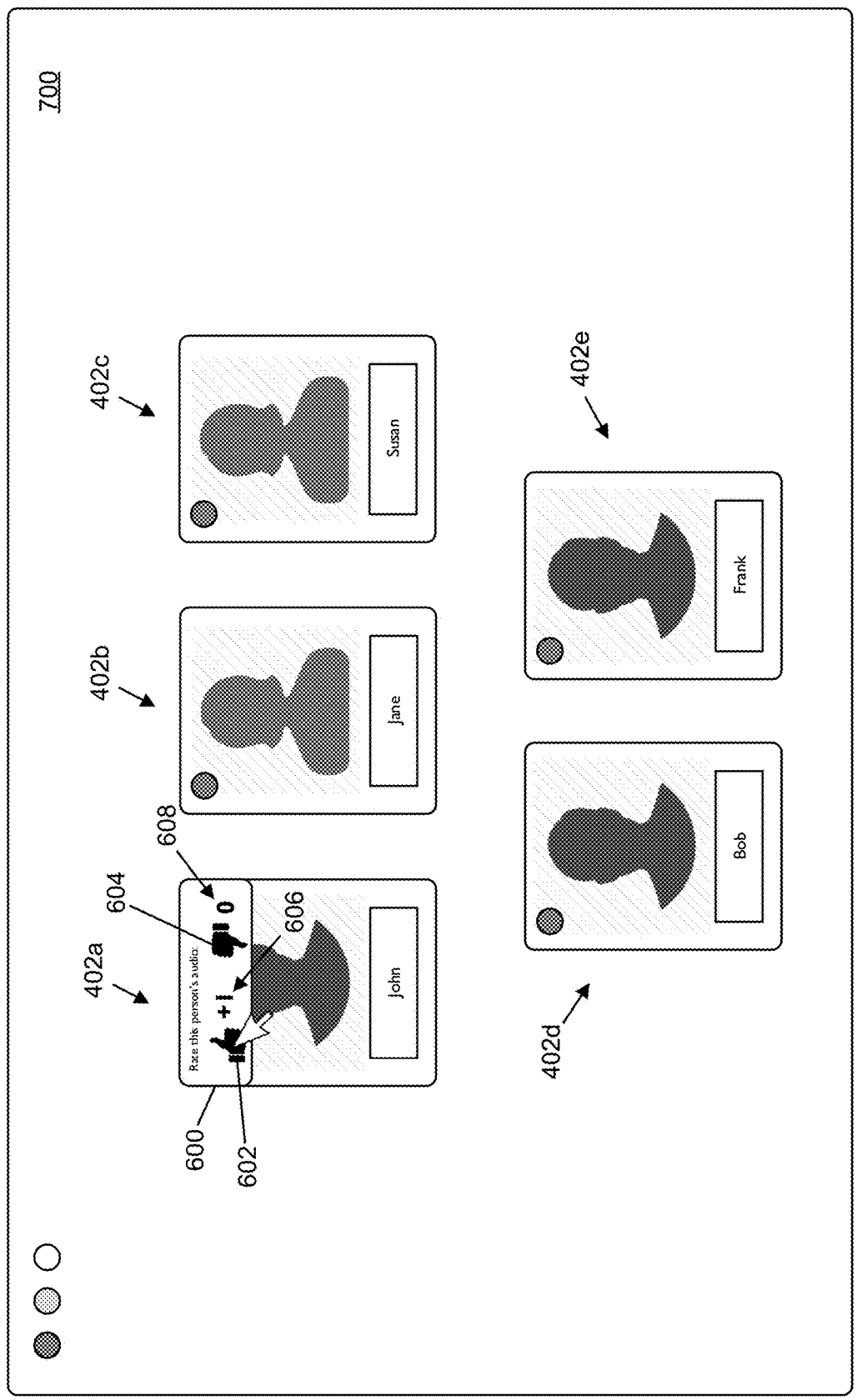
FIG. 7 illustrates the screen shot of FIG. 6 in which a participant "Susan" provides positive audio quality feedback related to a participant "John" via a first user interface control displayed in John's interactive participant object.
Figure 8:
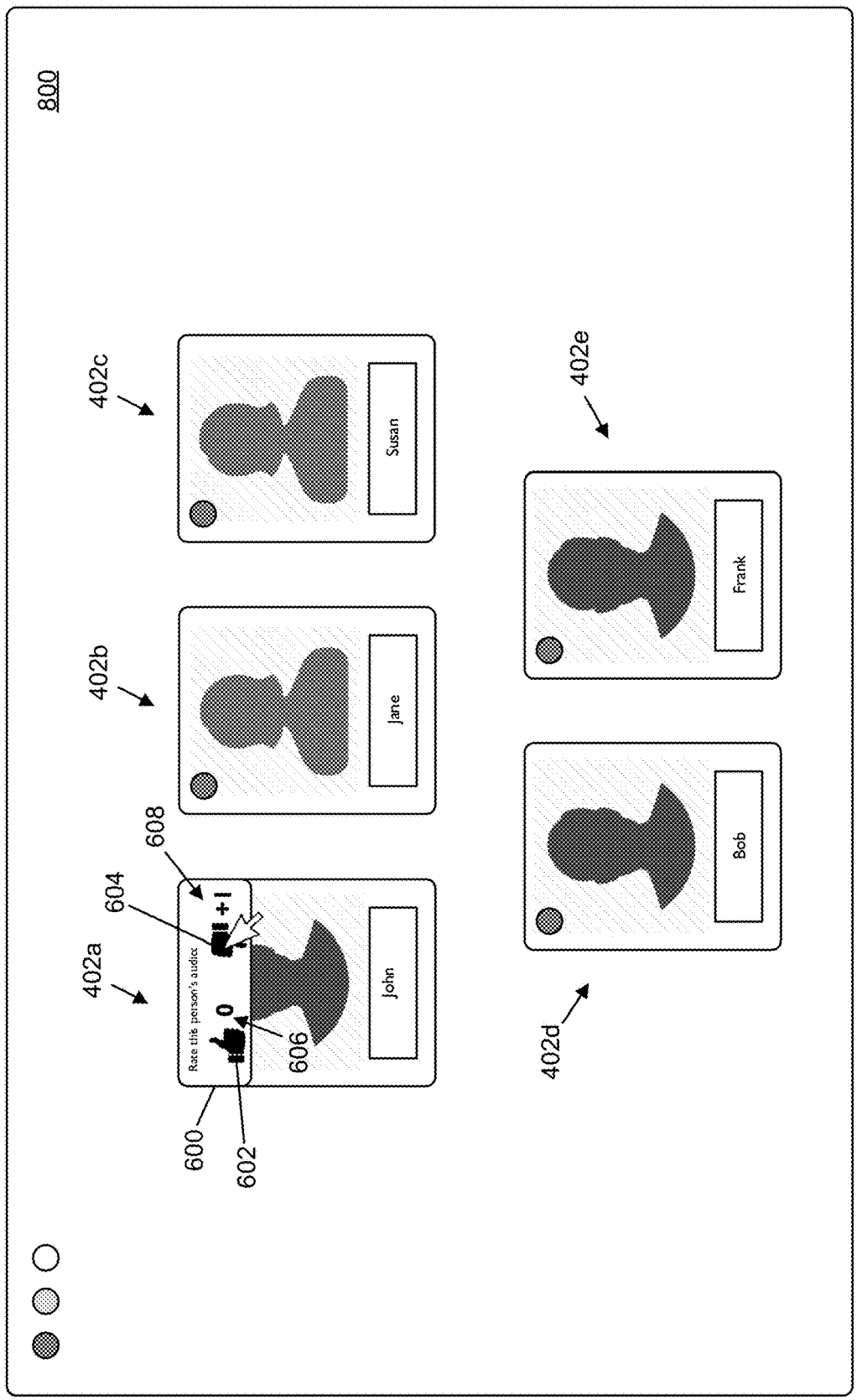
FIG. 8 illustrates the screen shot of FIG. 6 in which participant "Susan" provides negative audio quality feedback related to participant "John" via a second user interface control displayed in John's interactive participant object.

FIG. 7 illustrates a screen shot 700 of Susan's conference user interface 118 in which she has provided positive feedback by, for example, "upvoting" John's audio quality. In response to selecting the positive feedback icon 602, the corresponding counter 606 may be incremented to reflect Susan's positive audio quality feedback. FIG. 8 illustrates a screen shot 800 of Susan's conference user interface 118 in which she has provided negative feedback by, for example, "downvoting" John's audio quality. In response to selecting the negative feedback icon 604, the corresponding counter 608 may be incremented to reflect Susan's negative audio quality feedback.

Figure 9:
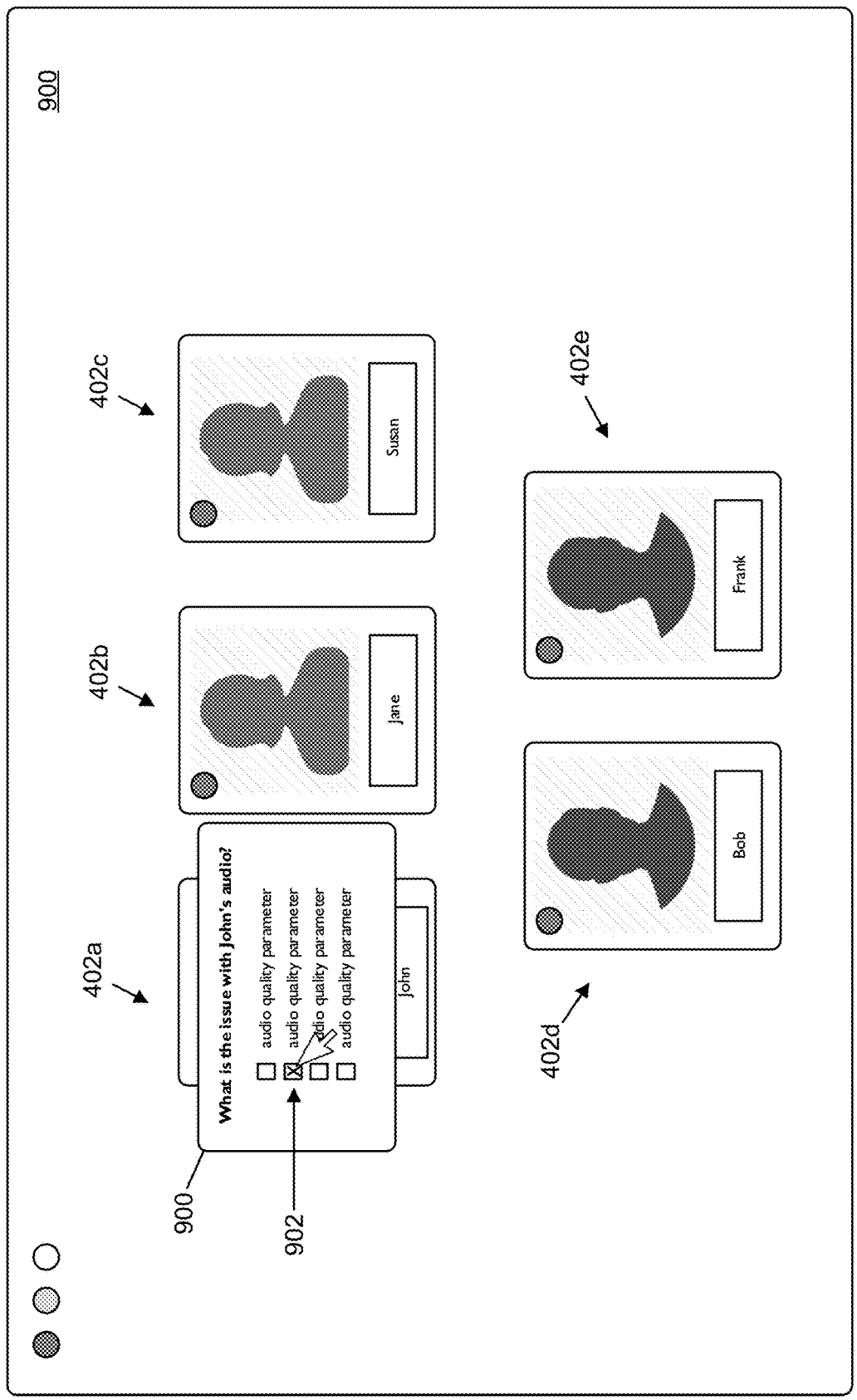
FIG. 9 illustrates Susan's conference user interface after she selects the second user interface control displayed in John's interactive participant object.

As illustrated in FIG. 9, in response to specifying negative audio quality feedback, the conference user interface 118 presented to Susan may be modified to display further user interface control(s) for specifying specific audio quality parameters. In the embodiment of FIG. 9, a display 900 may prompt Susan to select from a predefined list of poor audio quality parameters 902 or provide a custom description of the audio-related issue. In an embodiment, the poor audio quality parameters 902 may include any of the following or similar parameters: echo/feedback; background noise; volume (high/low); delay; broken/intermittent audio; no audio for a specific participant; repeated audio; no audio at all for any participants; and "garbled" audio.

It should be appreciated that the audio quality feedback submitted, via the interactive participant objects, by Susan (and any other participants) may be provided to participant audio quality feedback module 208 and stored in audio quality analytics database 126. The stored data may be structured according to the participant identifiers and user accounts 124. In this regard, audio quality analytics database 126 may track various types of data, including, for example, the participant identifier of the source of the audio quality feedback (i.e., the rating participant), the content of the audio quality feedback (e.g., positive/negative feedback, audio quality parameters, etc.), and the participant identifier of the subject of the audio quality feedback (i.e., the rated participant). It should be appreciated that, for each instance of a rating participant and a rated participant, the audio quality analytics database 126 may track various type of additional data, such as, for example, a carrier associated with the audio connection 202, a type of audio connection 202 (e.g., PSTN, Internet, VoIP, etc.), hardware parameter(s) associated with the rating/rated participant's computing devices 104, software configuration parameters associated with the rating/rated participant's computing devices 104, or any other useful data analytics.

Audio quality analytics database 126 may maintain ongoing analytics associated with the rated/rating participants to assist in trends analysis and develop a comprehensive algorithm for identifying audio-related problems. In this regard, it should be appreciated that audio quality analytics database 126 may be integrated with audio quality/connection auto-correction modules 206 to attempt to automatically correct audio problems submitted by the participants during the audio conference.

Returning to the method 300 in FIG. 3, at block 308, the conferencing system 102 may attempt to auto-correct certain types of audio problems in response to receiving negative audio quality feedback. Block 308 may perform any of the audio detection and auto-correction problems described above. For example, the conferencing system may detect and correct for background noise, detect an audio signal while a participant is on mute, suggest connection types based on location trends, detect and correct audio level, detect and correct echo, and detect and recommend a higher-quality codec. If the audio problem is automatically corrected, via modules 206, audio quality analytics database 126 may be updated and the method 300 may return to block 306. In alternative embodiments, block 308 may be optional. Where optional or if the audio problem is not automatically corrected, at block 310, the conferencing system 102 may poll one or more additional participants, via the conference user interface 118, to collect additional audio quality feedback. The presentation of the polling functionality and the collection of the polling results may be controlled via participant polling module 210.

Following the above example in which Susan has provided negative feedback via John's interactive participant object 402a, the conferencing system 102 may update the conference user interface 118 presented to Jane, Bob, and Frank with an audio poll display 1000 (FIG. 10). FIG. 10 illustrates an exemplary screen shot of the conference user interface 118 presented to Jane. Audio poll display 1000 may comprise a notification indicating that Susan has downvoted John's audio. Audio poll display 1000 may prompt Jane to rate John's audio quality. In this regard, audio poll display 1000 may include user interface controls for specifying negative feedback (e.g., a thumbs down vote) or positive feedback (e.g., a thumbs up vote). Audio poll display 1000 may include a current numerical value for counters 606 and 608.

Participant polling module 210 may aggregate and analyze the results of the poll from each of the additional participants (block 312). The aggregated poll results may be tracked, organized, and stored in audio quality analytics database 126 in the same manner as the audio quality feedback submitted via the interactive participant objects 402. In response to the aggregated poll results, at block 314, the conferencing system 102 may repeat the attempt to auto-correct the audio problems. If the audio problem is automatically corrected based on the poll results, audio quality analytics database 126 may be updated and the method 300 may return to block 306. If the audio problem is not automatically corrected (or if optional auto-correction is not performed at block 314), at block 316, the conferencing system 102 may determine, based on the poll results, whether the audio problem is likely due to the original rating participant's (e.g., Susan's) audio connection 202 or the original rated participant's (e.g., John's) audio connection 202. It should be appreciated that the analysis of the poll results may result in various determinations depending on, for example, the relative number of down votes and up votes. A first use case may result in validating or confirming the original rating participant's negative feedback of the rated participant. A second use case may result in invalidating the original rating participant's negative feedback of the rated participant. A third use case may result where the poll results are inconclusive.

Depending on the analysis of the poll results, at block 318, the conferencing system 102 may send a notification, via the conference user interface, to the rating participant, the rated participant, or both the rating and rated participants. The notification may comprise an audio alert indicating to the recipient that they may have an audio issue with suggested actions, prompts, etc. for resolving the potential issue. For example, in the first use case, module 212 may send an audio alert notification to the rated participant indicating that one or more of the participants are experiencing issues with their audio. In the second use case, module 212 may send an audio alert notification to the rating participant indicating that the audio problem appears to be with their audio and not the rated participant's audio. In the third use case, module 212 may send audio alert notifications to both the rating participant and the rated participant.

Following the above example in which Susan provided negative feedback via John's interactive participant object 402a, the poll results may result in the first use case where, for example, one or more polled participants (Jane, Bob, and/or Frank) have also "downvoted" John's audio. FIG. 11 illustrates a screen shot of the conference user interface 118 presented to John, which includes a notification display 1100 indicating that Susan and Jane are having issues with his audio along with a link 1102 directing John (i.e., the original rated participant) to, for example, a troubleshooting functionality or other resource for resolving the potential issue.

FIG. 12 illustrates a screen shot of the conference user interface 118 presented to Susan in the second use case, in which the poll results are deemed to invalidate Susan's initial negative audio quality feedback of John's audio. The screen shot includes a notification display 1200 indicating that the other participants in the audio conference are not having an issue with John's audio, as well as a link 1200 directing Susan (i.e., the original rating participant) to, for example, a troubleshooting functionality or other resource for resolving the potential issue. The troubleshooting functionality may comprise a "wizard" functionality, which prompts the participant through one or more steps based on what the conferencing system 102 detected and provide any suggested corrections to correct the detected problem, such as, un-mute if talking on mute, switch to better audio device selection if mismatch detected or location trend points to better choice, switch to better audio connection if bad connection detected or location trend points to a better choice, and suggest to reduce/adjust to lower quality screen share or turn off webcam to reduce bandwidth requirements in case of low bandwidth connections, to name a few.

It should be appreciated that the troubleshooting functionality may be configured to automatically send data to the conferencing system 102 if the audio problem is resolved. In other embodiments, the conference user interface 118 may prompt the user to specify whether the audio problem has been resolved or not. Audio quality analytics database 126 may be updated in response to the results of the troubleshooting functionality.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for crowd-sourced audio quality feedback in a conferencing system, the method comprising:
   a conferencing system establishing an audio conference between a plurality of participants via a communication network;
   providing a conference user interface to the plurality of participants;
   in response to a first participant speaking during the audio conference, a second participant indicating via the conference user interface that the first participant has low-quality audio; and
   the conferencing system polling one or more additional participants to specify via the conference user interface audio quality feedback associated with the first participant;
   the conferencing system determining that the polled audio quality feedback provided by the one or more additional participants validates that the first participant has low-quality audio;
   the conferencing system attempting to auto-correct an audio connection associated with the first participant; and
   if the conferencing system is unable to auto-correct the audio connection associated with the first participant, sending a notification to the first participant via the conference user interface indicating that the first participant has low-quality audio, the notification comprising one or more suggested actions for the first participant to take to improve the low-quality audio.

2. The method of claim 1, wherein the conference user interface displays an interactive participant object associated with each of the plurality of participants.

3. The method of claim 2, wherein the second participant indicating that the first participant has low-quality audio comprises:
   selecting the interactive participant object corresponding to the first participant.

4. The method of claim 3, further comprising:
   prompting the second participant via the conference user interface to select one of a plurality of low-quality audio parameters.

5. The method of claim 2, further comprising:
   in response to selecting the interactive participant object corresponding to the first participant, modifying the interactive participant object to display a first audio quality user interface control indicating a low-quality audio parameter and a second audio quality user interface control indicating a good quality audio parameter; and
   the second participant selecting the first audio quality user interface control to indicate that the first participant has low-quality audio.

6. The method of claim 1, further comprising:
   the conferencing system determining that the polled audio quality feedback provided by the one or more additional participants indicates that the first participant has an acceptable audio quality; and
   sending a notification to the second participant via the conference user interface indicating that the first participant has acceptable audio quality, the notification comprising one or more suggested actions for the second participant to take to improve the quality audio.

7. The method of claim 1, wherein the conferencing system polling the one or more additional participants comprises:
   prompting, via the conference user interface, each of the one or more additional participants to provide audio quality feedback associated with the first participant.

8. A computer program embodied in a non-transitory computer-readable medium and executable by a processor, the computer program providing crowd-sourced audio quality feedback in a conferencing system, the computer program comprising logic configure to:
   establish an audio conference between a plurality of participants via a communication network;
   provide a conference user interface to the plurality of participants;
   in response to a first participant speaking during the audio conference, receive via the conference user interface an indication from a second participant that the first participant has low-quality audio;
   polling via the conference user interface one or more additional participants to specify via the conference user interface audio quality feedback associated with the first participant;
   determine that the polled audio quality feedback provided by the one or more additional participants validates that the first participant has low-quality audio;
   attempt to auto-correct an audio connection associated with the first participant; and
   send, if the conferencing system is unable to auto-correct the audio connection associated with the first participant, a notification to the first participant via the conference user interface indicating that the first participant has low-quality audio, the notification comprising one or more suggested actions for the first participant to take to improve the low-quality audio.

9. The computer program of claim 8, wherein the conference user interface displays an interactive participant object associated with each of the plurality of participants.

10. The computer program of claim 9, wherein the logic configured to receive the indication from the second participant that the first participant has low-quality audio comprises:
    logic configured to receive a selection of the interactive participant object corresponding to the first participant.

11. The computer program of claim 10, further comprising:
    logic configured to prompt the second participant via the conference user interface to select one of a plurality of low-quality audio parameters.

12. The computer program of claim 9, further comprising:
    logic configured to modify the interactive participant object corresponding to the first participant to display a first audio quality user interface control indicating a low-quality audio parameter and a second audio quality user interface control indicating a good quality audio parameter; and
    logic configured to receive a selection by the second participant of the first audio quality user interface control to indicate that the first participant has low quality audio.

13. The computer program of claim 8, further comprising:
    logic configured to determine that the polled audio quality feedback provided by the one or more additional participants indicates that the first participant has an acceptable audio quality; and logic configured to send a notification to the second participant via the conference user interface indicating that the first participant has acceptable audio quality, the notification comprising one or more suggested actions for the second participant to take to improve the quality audio.

14. The computer program of claim 8, wherein the logic configured to poll the one or more additional participants comprises:
   logic configured to prompt, via the conference user interface, each of the one or more additional participants to provide audio quality feedback associated with the first participant.

15. A computer system for providing crowd-sourced audio quality feedback for an audio conference, the computer system comprising:
   a conferencing system establishing an audio conference between a plurality of participants via a communication network; and
   a server configured to communicate with the conferencing system and provide a conference user interface to the plurality of participants, the server comprising one or more crowd-sourced audio quality feedback modules comprising logic configured to:
      in response to a first participant speaking during the audio conference and via the conference user interface, receive audio quality feedback data from a second participant indicating that the first participant has low-quality audio;
      in response to the audio quality feedback data from the second participant, poll one or more additional participants to specify via the conference user interface further audio quality feedback data associated with the first participant;
      determine that the polled audio quality feedback provided by the one or more additional participants validates that the first participant has low quality audio;
      attempt to auto-correct an audio connection associated with the first participant; and
      if the audio connection associated with the first participant is not auto-corrected, send a notification to the first participant via the conference user interface indicating that the first participant has low-quality audio, the notification comprising one or more suggested actions for the first participant to take to improve the low-quality audio.

16. The computer system of claim 15, wherein the conference user interface displays an interactive participant object associated with each of the plurality of participants, and the one or more crowd-sourced audio quality feedback modules receive the audio quality feedback data from the second participant by:
   receiving a selection of the interactive participant object corresponding to the first participant by the second participant;
   in response to the selection of the interactive participant object, modifying the selected interactive participant object to display a first audio quality user interface control indicating a low-quality audio parameter and a second audio quality user interface control indicating a good quality audio parameter; and
   receiving from the second participant a selection of the first audio quality user interface control to indicate that the first participant has low-quality audio.

17. The computer system of claim 15, wherein the one or more crowd-sourced audio quality feedback modules further comprise logic configured to:
   determine that the polled audio quality feedback provided by the one or more additional participants indicates that the first participant has an acceptable audio quality; and
   send a notification to the second participant via the conference user interface indicating that the first participant has acceptable audio quality, the notification comprising one or more suggested actions for the second participant to take to improve the quality audio.

* * * * *